United States Patent Office 3,039,985
Patented June 19, 1962

3,039,985
COMPOSITION COMPRISING SOLUTION OF A SYNTHETIC LINEAR CONDENSATION POLYESTER IN A DIHALOGENATED ALIPHATIC KETONE AND PROCESS FOR MAKING
Arthur B. Beindorff, Chapel Hill, N.C., and Hobson D. De Witt, New Wilmington, Pa., assignors, by mesne assignments, to Monsanto Chemical Company, a corporation of Delaware
No Drawing. Filed Mar. 4, 1960, Ser. No. 12,658
19 Claims. (Cl. 260—32.8)

This invention relates to new compositions of matter and more particularly to new and useful compositions of matter comprising solutions or "dopes" of synthetic linear condensation polyesters. It is further concerned with new compositions of matter which are capable of being formed into useful articles such as ribbons, films, bristles, fibers, filaments and the like.

This application is a continuation-in-part of our copending application, Serial No. 602,898, filed August 8, 1956, now abandoned.

For the sake of simplicity, the present invention will be described as it is applied in the manufacture of fibers and filaments. However, the invention is not to be limited thereby except insofar as it may be limited by the appended claims.

Various methods are known for converting the polyesters described above into filaments and fibers, such as the so-called melt-spinning, wet-spinning and dry-spinning methods.

Melt-spinning comprises melting chips of a polyester on a heated grid and passing the melt through a filter bed of small particles, such as sand, and the like. Subsequently, the melt is forced through a spinneret and the filaments so formed are cooled. However, melt-spinning has certain disadvantages such as the employment of high temperatures which makes the addition of plasticizers and modifying agents difficult, because there is a tendency for the added agents to discolor and decompose.

In the dry-spinning method the polyester is dissolved in a solvent therefor and extruded through a spinneret in the usual manner. The solution is extruded into an atmosphere of inert gas which may be heated. The motion of the inert gaseous atmosphere, the extruded fiber and the application of heat all aid in disposing of the volatile solvent.

The wet-spinning method in which a solution of polyester is extruded into a bath containing a non-solvent for the polyester has a number of advantages over the melt-spinning method. For example, the wet-spinning method is generally more economical and can be carried out at lower temperatures. Therefore, plasticizers and other agents may be added with a minimum tendency toward discoloration and decomposition. Furthermore, certain types of plasticizers and modifying agents tend to be less compatible for blending in a melt at high temperatures, whereas they can be readily incorporated in a polyester solution at a low temperature. Solutions offer the further advantage in that they may be easily cast into films or coatings of uniform thickness. This is extremely difficult with a molten composition because of its relatively high viscosity.

The wet-spinning method, however, has not been widely employed commercially because of the lack of suitable solvents. Generally polyesters are insoluble in the more common organic solvents. From the standpoint of low cost, solvent power, non-corrosiveness and ease of recovery, there is a scarcity of suitable solvents for the more usual types of polyesters.

Accordingly, the principal object of the instant invention is the preparation of polyester solutions or "dopes" which are capable of being transformed into shaped articles.

Another object is to provide synthetic linear condensation polyester compositions in solutions which are stable and have non-gelation characteristics.

Another object of the invention is to prepare spinnable solutions of polyester compositions.

Other objects and advantages of the invention will be apparent from the following description.

The foregoing objects are accomplished by dissolving the synthetic linear condensation polyesters in an alpha, alpha prime dihalogenated aliphatic ketone containing from 3 to 5 carbon atoms. Among such compounds are 1,3'-dichloro-2-propanone, 1,3'-dichloro-2-butanone, 2,4'-dichloro-3-pentanone, 1,3'-dichloro-2-pentanone, 1,3'-dibromo-2-propanone, 1,3'-dibromo-2-butanone, 2,4'-dibromo-3-pentanone, 1,3'-dibromo-2-pentanone, 1,3'-difluoro-2-propanone, 1,3'-difluoro-2-butanone, 1,3'-difluoro-2-pentanone, 2,4'-difluoro-3-pentanone, and the like.

Solutions of high solids content and good stability can be prepared by mixing the polyester in the compounds mentioned hereinabove and heating to a temperature in a range of 125° C. to the boiling point of the mixture. If desired, the mixture may be stirred while heating. However, stirring is not necessary to effect solution, although it has been found that the polyester goes into solution more smoothly and evenly and with a greater rate of speed when stirring is employed. The maximum concentration of polyester that can be taken into solution will vary with the nature of the polyester, the solvent mixture and the temperature employed during the mixing operation.

In the manufacture of filaments and fibers a polyester having a molecular weight of at least 10,000 is employed in making a solution. Lower molecular weight polyesters may be utilized when the solution to be formed is to be used as a coating or as a lacquer. In preparing solutions or "dopes" suitable for spinning into filaments and fibers, 10 to 20 percent by weight of the polyester, based on the total weight of the solution, is suitable. While it is preferred to employ 10 to 20 percent by weight, based on the total weight of the solution, of the polyester in the solvent when the solution is to be used for the preparation of fibers and filaments, it is to be understood that as little as 5 percent or less and as much as 30 percent or more of the polyester may be utilized when the solution is to be employed for other purposes, such as a coating or lacquer and the like, or when lower or higher molecular weight polyesters are to be dissolved in the new solvents of this invention. The amount of any specific polyester, which can be dissolved in the solvents of this invention, will be readily evident to those skilled in the art.

The synthetic linear condensation polyesters contemplated in the practice of the invention are those formed from dicarboxylic acids and glycols, and copolyesters or modifications of these polyesters and copolyesters. In a highly polymerized condition, these polyesters and copolyesters can be formed into filaments and the like and subsequently oriented permanently by cold drawing. The polyesters and copolyesters specifically useful in the instant invention are those resulting from heating one or more of the glycols of the series HO—$(CH_2)_n$—OH, in which $n$ is an integer from 2 to 10, with one or more dicarboxylic acids or ester-forming derivatives thereof. Among the dicarboxylic acids and ester-forming derivatives thereof useful in the present invention there may be named terephthalic, isophthalic acid, sebacic acid, adipic acid, p-carboxyphenoacetic acid, succinic acid, p,p'-dicarboxybiphenyl, p,p'-dicarboxycarbanilide, p,p'-dicarboxythiocarbanilide, p,p' - dicarboxydiphenylsulfone, p- carboxyphenoxyacetic acid, p-carboxyphenoxypropionic acid, p-carboxyphenoxybutyric acid, p-carboxyphenoxyvaleric acid, p-carboxyphenoxyhexanoic acid, p-carboxyphenoxyheptanoic acid, p,p'-dicarboxydiphenylmethane, p,p'-dicarboxydiphenylethane, p,p'-dicarboxydiphenylpropane, p,p'-dicarboxydiphenylbutane, p,p'-dicarboxydiphenylpentane, p,p'-dicarboxydiphenylhexane, p,p'-dicarboxydiphenylheptane, p,p'-dicarboxydiphenyloctane, p,p'-dicarboxydiphenoxyethane, p,p'-dicarboxydiphenoxypropane, p,p'-dicarboxydiphenoxybutane, p,p'-dicarboxydiphenoxypentane, p,p'-dicarboxydiphenoxyhexane, 3-alkyl 4-(beta-carboxy-ethoxy) benzoic acid, oxalic acid, glutaric acid, pimelic acid, suberic acid, azealic acid and the dioxy acids of ethylene dioxide having the general formula, HOOC—$(CH_2)_n$—O—$CH_2CH_2$—O—$(CH_2)_n$—COOH wherein $n$ is an integer from 1 to 4, and the aliphatic and cycloaliphatic aryl esters and half esters, ammonium and amine salts, and the acid halides of the above-named compounds and the like. Examples of the glycols which may be employed in practicing the instant invention are ethylene glycol, trimethylene glycol, tetramethylene glycol and decamethylene glycol, etc. Polyethylene terephthalate, however, is preferred because of the ready availability of terephthalic acid and ethylene glycol, from which it is made. It also has a relatively high melting point of about 250 through 255° C. and this property is particularly desirable in the manufacture of filaments in the textile industry.

Among the modified polyesters and copolyesters which are useful in the practice of the instant invention are the polyesters and copolyesters mentioned above modified with chain-terminating groups having hydrophilic properties, such as the monofunctional ester-forming polyethers bearing the general formula:

(I)    R—O—$[(CH_2)_mO]_x(CH_2)_n$—OH wherein R is an alkyl group containing 1 to 18 carbon atoms or an aryl group containing 6 to 10 carbon atoms, and $m$ and $n$ are integers from 2 to 22, and $x$ is a whole number indicative of the degree of polymerization, that is, $x$ is an integer from 1 to 100 or greater. Examples of such compounds are methoxypolyethylene glycol, ethoxypolyethylene glycol, n-propoxypolyethylene glycol, isopropoxypolyethylene glycol, butoxypolyethylene glycol, phenoxypolyethylene glycol, methoxypolypropylene glycol, methoxypolybutylene glycol, phenoxy polypropylene glycol, phenoxypolybutylene glycol, methoxypolymethylene glycol, and the like. Suitable polyalkylvinyl ethers having one terminal hydroxyl group are the addition polymers prepared by the homopolymerization of alkylvinyl ethers wherein the alkyl group contains from 1 to 4 carbon atoms. Examples of such chain-terminating agents are hydroxy polymethylvinyl ether, hydroxy polyethylvinyl ether, hydroxy polypropylvinyl ether, hydroxy polybutylvinyl ether, hydroxy polyisobutylvinyl ether, and the like. The chain-terminating agents or compounds may be employed in the preparation of the modified polyesters in amounts ranging from 0.05 mol percent to 4.0 mol percent, based on the amount of dicarboxylic acid or dialkyl ester thereof employed in the reaction mixture. It is to be noted that when chain-terminating agents are employed alone, i.e., without a chain-branching agent, the maximum amount that can be employed in the reaction mixture is 1.0 mol percent. Thus, unexpectedly, the addition of controlled amounts of chain-branching agents along with the chain-terminating agents allows the introduction of an increased amount of the latter into the polymer chain than is otherwise possible when employing the chain-terminating agents alone.

One will readily appreciate that the weight percent of chain-terminating agent which may be employed in this invention will vary with the molecular weight of the agent. The range of average molecular weight of the chain-terminating agents suitable for use in this invention is from 500 to 5000, with those agents having a molecular weight in the range of 1000 to 3500 being preferred.

Materials suitable as chain-branching agents or cross-linking agents, which are employed to increase the viscosity or molecular weight of the polyesters, are the polyols which have a functionality greater than two, that is, they contain more than two functional groups, such as hydroxyl. Examples of suitable compounds are compounds having the formula:

(II)    R—$(OH)_n$ wherein R is a saturated aliphatic hydrocarbon radical containing from 3 to 6 carbon atoms and $n$ is an integer from 3 to 6, for example, glycerol, sorbitol, pentaerythritol, 1,2,6-hexanetriol, and the like; compounds having the formula:

(III)    R—$(CH_2OH)_3$ wherein R is a saturated aliphatic hydrocarbon radical containing from 2 to 6 carbon atoms, for example, trimethylol ethane, trimethylol propane, and like compounds up to trimethylol hexane; and the compounds having the formula:

(IV) 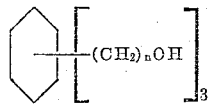

wherein $n$ is an integer from 1 to 6. As examples of compounds having the above formula there may be named 1,3,5-trimethylol benzene, 1,3,5-triethylol benzene, 1,3,5-tripropylol benzene, 1,3,5-tributylol benzene, 1,2,4-trimethylol benzene, 1,2,4-triethylol benzene, etc.

Aromatic polyfunctional acid esters may also be employed in this invention as chain-branching agents and particularly those having the formula:

(V)

wherein $n$ is an integer from 3 to 5. As examples of compounds having the above formula there may be named trimethyl trimesate, tetramethyl pyromellitate, tetramethyl mellophonate, trimethyl hemimellitate, trimethyl trimellitate, tetramethyl prehnitate, and the like. In addition, there may be employed mixtures of the above esters which are obtained in practical synthesis. That is, in most instances when preparing any of the compounds having the above formula, other related compounds having the same formula may be present in small amounts as impurities. This does not affect the compound as a chain-branching agent in the preparation of the modified polyesters and copolyesters described herein.

The chain-branching agents or cross-linking agents may be employed in the preparation of the polyesters and copolyesters in amounts ranging from 0.05 mol percent to 2.4 mol percent, based on the amount of dicarboxylic acid or dialkyl ester thereof employed in the reaction mixture. The preferred range of chain-branching agent for use in the persent invention is from 0.1 to 1.0 mol percent.

In the practice of the present invention, the calculated amounts of chain-terminating agent or chain terminating agent and chain-branching agent or cross-linking agent are charged to the reaction vessel at the beginning of the first stage of the esterification reaction and the reaction proceeds as in any well-known esterification polymerization. The first step or stage of the reaction is carried out at atmoshperic pressure and at a temperature in the range of 90° C. to 250° C. and preferably between 150° and 220° C. when from 0.001 to 1.0 percent by weight, based on the weight of the dicarboxylic acid or ester thereof, of a suitable esterification catalyst, such as manganous formate or zinc acetylacetonate, is employed. If desired, the reaction may be carried out at pressures above or below atmospheric. Methanol is evolved which is continuously removed by distillation. At the completion of the first stage, the excess glycol, if any, is distilled off prior to entering the second stage of the reaction.

In the second or polymerization stage, the reaction is conducted at reduced pressures and preferably in the presence of an inert gas, such as nitrogen, in order to prevent oxidation. This can be accomplished by maintaining a nitrogen blanket over the reactants, said nitrogen containing less than 0.003 percent oxygen. For optimum results, a pressure within the range of less than 1 mm. up to 5 mm. of mercury is employed. This reduced pressure is necessary to remove the free ethylene glycol that is formed during this stage of the reaction, the ethylene glycol being volatilized under these conditions and removed from the system. The polymerization step is conducted at a temperature in the range of 220° to 300° C. This stage of the reaction may be effected either in the liquid, melt or solid phase. In the liquid phase, particularly, reduced pressures must be employed in order to remove the free ethylene glycol which emerges from the polymer as a result of the condensation reaction.

In the preparation of the described polyesters, the first stage of the reaction takes place in approximately 45 minutes to 2 hours, when employing a suitable esterification catalyst. In the absence of a catalyst, times up to 6 hours may be necessary in order to complete this phase of the reaction. In the second stage, a reaction time of approximately 1 to 4 hours may be employed with a time of 1 to 3 hours being the optimum, depending on catalyst concentration, temperature, viscosity desired, amount of color allowable in the finished polymer, etc.

The modified linear condensation polyesters, produced in accordance with the present invention, have a specific viscosity in the range of 0.30 to 0.60, which represents the fiber- and filament-forming polymers. It is to be understood, of course, that non-fiber-forming polyesters may be produced by means of the present invention, which have a specific viscosity greater or less than that stated above and such polyesters are useful, for example, in the manufacture of coating compositions, lacquers, molding compositions, and the like. This specific viscosity range and variations thereof also are applicable to the unmodified polyesters, such as polyethylene terephthalate. The specific viscosity range of the fiber-forming polymers, that is, from 0.3 to about 0.6, indicates high molecular weight polymers of from about 10,000 to about 50,000 molecular weight.

If it is desired to produce shaped articles from the polyester solutions of the present invention which have a modified appearance or modified properties, various agents to accomplish these effects may be added to the polyester solutions of this invention prior to the fabrication of the articles without any ill effects thereon. Such added agents might be plasticizers, pigments, dyes, antistatic agents, fire-retarding agents, etc.

The following examples are intended to illustrate the new compositions of the invention more fully, but are not intended to limit the scope of the invention, for it is possible to effect many modifications therein. In the examples, all parts and percents are by weight unless otherwise indicated.

*Example I*

9 parts of 1,3-dichloro-2-propanone and 1 part of polyethylene terephthalate were mixed together and warmed with stirring to 145° C. where the polymer readily dissolved yielding a clear fluid solution suitable for both wet or dry spinning. On cooling, the solution solidified at 90° C. but was easily redissolved upon the application of heat. The solution was stable at temperatures above 95° C.

*Example II*

9 parts of 1,3-dichloro-2-propanone and 1 part of polyethylene terephthalate modified with 0.64 mol percent of ethoxypolyethylene glycol, based on the mols of polyethylene terephthalate, were mixed together and heated with stirring to 135° C. where the polymer readily dissolved yielding a clear fluid solution suitable for both wet or dry spinning. On cooling, the solution solidified at 90° C. but was easily redissolved upon the application of heat. The solution was stable at temperatures above 95° C.

*Example III*

9 parts of 1,3-dichloro-2-propanone and 1 part of polyethylene terephthalate modified with 1.28 mol percent of ethoxypolyethylene glycol, based on the mols of polyethylene terephthalate, were mixed together and warmed with stirring to 125° C. where the polymer readily dissolved yielding a clear fluid solution suitable for both wet or dry spinning. On cooling, the solution solidified at 80° C. but was easily redissolved upon the application of heat. The solution was stable at temperatures above 85° C.

*Example IV*

8 parts of 1,3-dichloro-2-propanone and 2 parts of polyethylene terephthalate were mixed together and warmed with stirring to 145° C. where the polymer readily dissolved yielding a clear fluid solution suitable for both wet or dry spinning. On cooling, the solution solidified at 125° C. but was easily redissolved upon the application of heat.

*Example V*

There was charged to a reaction vessel 185 parts of dimethyl terephthalate, 224 parts of ethylene glycol, 11.1 parts of methoxypolyethylene glycol with an average molecular weight of about 2000, 0.185 part of pentaerythritol and 0.09 part of manganous acetylacetonate. The reactants were mixed and heated at 177° C. until solution was effected. The mixture was maintained at this temperature for 90 minutes to bring about the ester interchange reaction. Thereafter, the temperature was raised to 225° C. to remove excess ethylene glycol and maintained at this temperature under a vacuum of less than 1 mm. of mercury for 3 hours to effect polymerization. There was obtained a high molecular weight polyester having a melting point of about 255° C. and a specific viscosity of about 0.3 at 25° C. calculated in a 2 to 1 mixture of phenol-trichloro phenol containing 0.5 percent by weight of the polymer. 8.5 parts of 1,3-dichloro-2-propanone and 1.5 parts of the polyester so prepared were mixed and heated to 170° C. where the polymer readily dissolved, yielding a clear fluid solution suitable for both wet and dry spinning. On cooling, the polymer precipitated at 115° C. but was easily dissolved upon the application of heat.

*Example VI*

There was charged to a reaction vessel 185 parts of dimethyl terephthalate, 224 parts of ethylene glycol, 18.5 parts of methoxypolyethylene glycol with an average molecular weight of about 3000, 0.425 part of trimethyl trimesate and 0.09 part of manganous formate. The reactants were mixed and heated at 177° C. until solution was effected. The mixture was maintained at this temperature for 90 minutes to bring about the ester interchange reaction. Thereafter, the temperature was raised to 225° C. to remove excess ethylene glycol and maintained at this temperature under a vacuum of less than 1 mm. of mercury for 3 hours to effect polymerization. There was obtained a high molecular weight polyester having a melting point of about 255° C. and a specific viscosity of about 0.3 at 25° C. calculated in a 2 to 1 mixture of phenol-trichloro phenol containing 0.5 percent by weight of the polymer. 9.5 parts of 1,3-dichloro-2-propanone and 0.5 parts of the polyester so prepared were mixed and heated with stirring to 162° C. where the polymer readily dissolved, yielding a clear fluid solution suitable for both wet and dry spinning. On cooling, the polymer precipitated at 85° C. but was easily dissolved upon the application of heat.

The polyester compositions of this invention can be usefully employed in the coating field, for example, in the coating of textile fabrics. Thus, a fabric can be coated and/or impregnated with the polyester solutions described herein and then treated, that is soaked, in a non-solvent for the polyester in order to precipitate the polyester in and on the fabric. Metals, paper and impervious films may also be coated with the polyester compositions of this invention by conventional and well-known procedures.

One of the principal advantages of the instant invention is that it provides polyester compositions which are readily convertible to useful shaped articles by the wet or dry-spinning methods which are more economical than the melt-spinning method. Numerous other advantages of this invention will be apparent to those skilled in the art from reading the instant description.

As many widely different embodiments of this invention may be made without departing from the spirit and scope thereof, it is to be understood that the same is not to be limited to the specific embodiments thereof, except as defined in the appended claims.

We claim:
1. A new composition of matter comprising a solution of a synthetic linear condensation polyester dissolved in a solvent comprising an alpha, alpha prime dihalogenated aliphatic ketone containing from 3 to 5 carbon atoms, said polyester being selected from the group consisting of (A) polyesters formed by the reaction of at least one dicarboxylic acid selected from the group consisting of aromatic dicarboxylic acids and aliphatic dicarboxylic acids and at least one glycol of the series

$$HO—(CH_2)_n—OH$$

wherein $n$ is an integer from 2 to 10, (B) the polyesters of (A) modified by 0.05 mol percent to 1.0 mol percent, based on the total weight of said dicarboxylic acid, of a chain-terminator selected from the group consisting of polyalkylvinyl ethers having one terminal hydroxyl group wherein the alkyl group contains 1 to 4 carbon atoms, and compounds having the formula, (I)     $R—O—[(CH_2)_mO]_x(CH_2)_n—OH$ wherein R is selected from the group consisting of alkyl groups containing 1 to 18 carbon atoms and aryl groups containing 6 to 10 carbon atoms, $m$ and $n$ are integers from 2 to 22, and $x$ is an integer from 1 to 100, indicative of the degree of polymerization, and (C) the polyesters of (B) containing 0.05 mol percent to 4.0 mol percent, based on the total weight of said dicarboxylic acid, of said chain-terminator, modified by 0.05 mol percent to 2.4 mol percent, based on the total weight of said dicarboxylic acid, of a chain-branching agent selected from the group consisting of compounds having the formula, (II)     $R—(OH)_n$ wherein R is a saturated aliphatic hydrocarbon radical containing from 3 to 6 carbon atoms and $n$ is an integer from 3 to 6, compounds having the formula, (III)     $R—(CH_2OH)_3$ wherein R is a saturated aliphatic hydrocarbon radical containing from 2 to 6 carbon atoms, compounds having the formula, (IV)
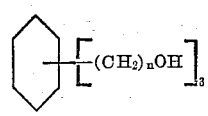

wherein $n$ is an integer from 1 to 6, and compounds having the formula, (V)
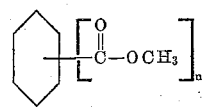

wherein $n$ is an integer from 3 to 5.

2. A new composition of matter as defined in claim 1 wherein the polyester is polyethylene terephthalate.
3. A new composition of matter as defined in claim 1 wherein the solvent is 1,3-dichloro-2-propanone.
4. A new composition of matter as defined in claim 1 wherein the solvent is 1,3-dichloro-2-butanone.
5. A new composition of matter as defined in claim 1 wherein the solvent is 1,3-dichloro-2-pentanone.
6. A new composition of matter as defined in claim 1 wherein the solvent is 2,4-dichloro-3-pentanone.
7. A new composition of matter as defined in claim 1 wherein the solvent is 1,3-difluoro-2-propanone.
8. A new composition of matter comprising a solution of a synthetic linear condensation polyester dissolved in a solvent comprising an alpha, alpha prime dihalogenated aliphatic ketone, said polyester being selected from the group consisting of (A) polyesters formed by the reaction of at least one dicarboxylic acid selected from the group consisting of aromatic dicarboxylic acids and aliphatic dicarboxylic acids and at least one glycol of the series $HO—(CH_2)_n—OH$ wherein $n$ is an integer from 2 to 10, (B) the polyesters of (A) modified by 0.05 mol percent to 1.0 mol percent, based on the total weight of said dicarboxylic acid, of a chain terminator selected from the group consisting of polyalkylvinyl ethers having one terminal hydroxyl group wherein the alkyl group contains 1 to 4 carbon atoms, and compounds having the formula, (I)     $R—O—[(CH_2)_mO]_x(CH_2)_n—OH$ wherein R is selected from the group consisting of alkyl groups containing 1 to 18 carbon atoms and aryl groups containing 6 to 10 carbon atoms, $m$ and $n$ are integers from 2 to 22, and $x$ is an integer from 1 to 100, indicative of the degree of polymerization, and (C) the polyesters of (B) containing 0.05 mol percent to 4.0 mol percent, based on the total weight of said dicarboxylic acid, of said chain terminator, modified by 0.05 mol percent to 2.4 mol percent based on the total weight of said dicarboxylic acid, of a chain-branching agent selected from the group consisting of compounds having the formula, (II)     $R—(OH)_n$ wherein R is a saturated aliphatic hydrocarbon radical containing from 3 to 6 carbon atoms and $n$ is an integer from 3 to 6, and compounds having the formula, (III)     $R—(CH_2OH)_3$ wherein R is a saturated aliphatic hydrocarbon radical containing from 2 to 6 carbon atoms, compounds having the formula, (IV)
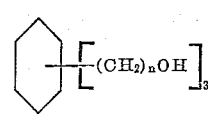

wherein $n$ is an integer from 1 to 6, and compounds having the formula, (V)
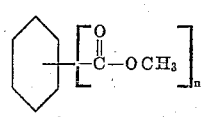

wherein $n$ is an integer from 3 to 5, said polyester being employed in a range of 10 to 20 percent, based on the total weight of the composition.

9. A new fiber-forming composition comprising a mixture of 10 to 20 percent, based on the total weight of the composition, of polyethylene terephthalate having a molecular weight of at least 10,000 and a solvent comprising an alpha, alpha prime dihalogenated aliphatic ketone containing from 3 to 5 carbon atoms.

10. A process for preparing a new composition of matter comprising mixing a synthetic linear condensation polyester with a solvent comprising an alpha, alpha prime dihalogenated aliphatic ketone, and heating the mixture to a temperature in a range of 125° C. to the boiling point of the mixture, said polyester being selected from the group consisting of (A) polyesters formed by the reaction of at least one dicarboxylic acid selected from the group consisting of aromatic dicarboxylic acids and aliphatic dicarboxylic acids and at least one glycol of the series HO—$(CH_2)_n$—OH wherein $n$ is an integer from 2 to 10, (B) the polyesters of (A) modified by 0.05 mol percent to 1.0 mol percent, based on the total weight of said dicarboxylic acid, of a chain-terminator selected from the group consisting of polyalkylvinyl ethers having one terminal hydroxyl group wherein the alkyl group contains 1 to 4 carbon atoms, and compounds having the formula, (I)      R—O—$[(CH_2)_mO]_x(CH_2)_n$—OH wherein R is selected from the group consisting of alkyl groups containing 1 to 18 carbon atoms and aryl groups containing 6 to 10 carbon atoms, $m$ and $n$ are integers from 2 to 22, and $x$ is an integer from 1 to 100, indicative of the degree of polymerization, and (C) the polyesters of (B) containing 0.05 mol percent of said chain-terminator, modified by 0.05 mol percent to 2.4 mol percent based on the total weight of said dicarboxylic acid, of a chain-branching agent selected from the group consisting of compounds having the formula, (II)      R—$(OH)_n$ wherein R is a saturated aliphatic hydrocarbon radical containing from 3 to 5 carbon atoms and $n$ is an integer from 3 to 6, compounds having the formula, (III)      R—$(CH_2OH)_3$ wherein R is a saturated aliphatic hydrocarbon radical containing from 2 to 6 carbon atoms, compounds having the formula, (IV)
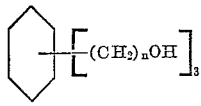

wherein $n$ is an integer from 1 to 6, and compounds having the formula, (V)
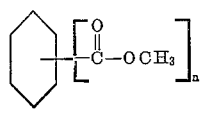

wherein $n$ is an integer from 3 to 5.

11. The process as defined in claim 10 wherein the solvent is 1,3-dichloro-2-propanone.

12. A new composition of matter as defined in claim 1 wherein the polyester is polyethylene terephthalate, the chain terminator is ethoxypolyethylene glycol and the chain-branching agent is pentaerythritol.

13. A new composition of matter as defined in claim 1 wherein the polyester is polyethylene terephthalate and the chain terminator is methoxypolyethylene glycol.

14. A new composition of matter as defined in claim 1 wherein the polyester is polyethylene terephthalate, the chain terminator is methoxypolyethylene glycol and the chain-branching agent is trimethyl trimesate.

15. A new composition of matter as defined in claim 1 wherein the polyester is polyethylene terephthalate, the chain terminator is methoxypolyethylene glycol and the chain-branching agent is pentaerythritol.

16. The process defined in claim 10 wherein the polyester is polyethylene terephthalate, the chain terminator is methoxypolyethylene glycol and the chain-branching agent is pentaerythritol.

17. The process defined in claim 10 wherein the polyester is polyethylene terephthalate, the chain terminator is ethoxypolyethylene glycol and the chain-branching agent is pentaerythritol.

18. The process defined in claim 10 wherein the polyester is polyethylene terephthalate and the chain terminator is methoxypolyethylene glycol.

19. The process defined in claim 10 wherein the polyester is polyethylene terephthalate, the chain terminator is methoxypolyethylene glycol and the chain-branching agent is trimethyl trimesate.

References Cited in the file of this patent
UNITED STATES PATENTS
2,861,049      Fuchs _____ Nov. 18, 1958